United States Patent
Allue et al.

(10) Patent No.: US 7,228,457 B2
(45) Date of Patent: Jun. 5, 2007

(54) PERFORMING DIAGNOSTIC OPERATIONS UPON A DATA PROCESSING APPARATUS WITH POWER DOWN SUPPORT

(75) Inventors: Conrado Blasco Allue, Austin, TX (US); Paul Kimelman, Alamo, CA (US); Andrew Brookfield Swaine, Cambridge (GB); Richard Roy Grisenthwaite, Nr Royston (GB)

(73) Assignee: ARM Limited, Cambridge (GB)

( * ) Notice: Subject to any disclaimer, the term of this patent is extended or adjusted under 35 U.S.C. 154(b) by 499 days.

(21) Appl. No.: 10/801,131

(22) Filed: Mar. 16, 2004

(65) Prior Publication Data
US 2005/0210333 A1 Sep. 22, 2005

(51) Int. Cl.
*G06F 11/00* (2006.01)
(52) U.S. Cl. .................................................. 714/27
(58) Field of Classification Search .................. 714/27, 714/31, 32, 39, 43, 37, 30
See application file for complete search history.

(56) References Cited

U.S. PATENT DOCUMENTS

| | | | | |
|---|---|---|---|---|
| 5,153,881 A | * | 10/1992 | Bruckert et al. | 714/10 |
| 6,000,040 A | * | 12/1999 | Culley et al. | 714/31 |
| 6,134,668 A | * | 10/2000 | Sheikh et al. | 713/310 |
| 6,202,160 B1 | * | 3/2001 | Sheikh et al. | 713/310 |
| 6,249,885 B1 | * | 6/2001 | Johnson et al. | 714/47 |
| 2002/0104031 A1 | * | 8/2002 | Tomlinson et al. | 713/320 |

FOREIGN PATENT DOCUMENTS

| | | |
|---|---|---|
| EP | 0 565 079 | 10/1993 |
| JP | 2002304236 | 10/2002 |
| WO | WO 2003/079172 | 9/2003 |

* cited by examiner

*Primary Examiner*—Nadeem Iqbal
(74) *Attorney, Agent, or Firm*—Nixon & Vanderhye P.C.

(57) ABSTRACT

A system-on-chip integrated circuit 2 is provided with multiple data processing circuits 4, 6, 8 each with an associated diagnostic interface circuit 16, 18, 20 connected via a diagnostic transaction bus 14 to a diagnostic transaction master circuit 12. The diagnostic master transaction circuit 12 issues diagnostic transaction requests to the diagnostic interface circuits 16, 18, 20. If the associated data processing circuits 4, 6, 8 are powered-down, or otherwise non responsive, then the diagnostic interface circuit 16, 18, 20 returns a diagnostic bus transaction error signal to the diagnostic transaction master circuit 12. A sticky-bit latch 30 within each diagnostic interface circuit 16, 18, 20 serves to record a power-down event and force generation of the diagnostic bus transaction error signal until that sticky bit is cleared by the diagnostic mechanisms. This ensure the diagnostic mechanisms are made aware of the power-down event so they may take any appropriate remedial action that might be necessary as a result of that power-down event.

14 Claims, 3 Drawing Sheets

PERFORMING DIAGNOSTIC OPERATIONS UPON A DATA PROCESSING APPARATUS WITH POWER DOWN SUPPORT

BACKGROUND OF THE INVENTION

1. Field of the Invention

This invention relates to the field of data processing systems. More particularly, this invention relates to diagnostic mechanisms used to perform diagnostic operations upon data processing systems when those data processing systems are subject to power down during diagnostic operations.

2. Description of the Prior Art

It is known to provide diagnostic mechanisms such as serial scan chains and embedded trace mechanisms within integrated circuits so as to assist in the design of such systems. As the systems increase in complexity, and the number of different circuit elements within the systems increases, there is an increased need for effective, easy to use and efficient diagnostic mechanisms so that the various operational modes of such complicated system-on-chip type designs can be properly evaluated.

It is also known to provide data processing systems with mechanisms whereby portions of the circuit may be placed into low-power states during operation when the capabilities of those portions are not required; this advantageously reduces power consumption. These power control mechanisms are useful in extending battery life within portable systems and it is also generally desirable to reduce power consumption in non-portable systems. With the increasing complexity of integrated circuit designs it is also known that different portions of an integrated circuit may be powered up and powered down during operation depending upon the particular state of the system at that time and the demands being placed upon it. Such integrated circuits execute at significantly higher clock speeds than do the diagnostic mechanisms associated with them. Thus, whilst the diagnostic mechanisms may operate in real time to perform diagnostic operations upon the systems, they are not able to properly track power up and power down events which can take place too rapidly for the relatively slow diagnostic mechanisms.

SUMMARY OF THE INVENTION

Viewed from one aspect the present invention provides apparatus for processing data, said apparatus comprising:

a data processing circuit operable to perform data processing;

a diagnostic interface circuit coupled to said data processing circuit and operable to perform diagnostic operations upon said data processing circuit, said data processing circuit being switchable between a first state in which said diagnostic interface circuit cannot perform at least some diagnostic operations upon said data processing circuit and a second state in which said diagnostic interface circuit can perform said at least some diagnostic operations upon said data processing circuit; and a diagnostic transaction request master circuit coupled via a diagnostic transaction bus to said diagnostic interface circuit and operable to issue diagnostic transaction requests to said diagnostic interface circuit; wherein said diagnostic interface circuit is responsive to a diagnostic transaction request received from said diagnostic transaction request master whilst said data processing circuit is in said first state to return a diagnostic bus transaction error signal to said diagnostic transaction request master.

The present technique recognizes that within a data processing system a given data processing circuit may have states in which it is not able to respond to certain diagnostic operations, such as due to the data processing circuit concerned being powered-down at the particular point in time at which the diagnostic operation query is made. Furthermore, since the processing speed of the system being investigated is significantly higher than the diagnostic system, the data processing circuit concerned may be powered-down and powered up without the diagnostic system being aware of this activity. In such circumstances, the diagnostic system may assume it has programmed a certain state into the data processing circuit being investigated, but this state can have been lost through power down event and accordingly require reprogramming before the diagnostic operation concerned can be performed. Whilst a superficially attractive approach to this problem would be to query the power status of the data processing circuit being investigated prior to each diagnostic operation, such an approach would suffer from the problem that race conditions could occur whereby between returning a result that the data processing circuit was powered up and the diagnostic operation being instructed the data processing circuit could for reasons unrelated to the diagnostic operations be powered-down. Such power status queries also waste diagnostic bandwidth. The diagnostic transaction request master could be a dedicated hardware element or alternatively could be another hardware element being reused to serve this purpose (e.g. a general purpose processor).

The present technique utilizes the diagnostic transaction bus (which may be a bus having multiple slaves and a master, a point-to-point connection or another form a communication link) to signal when the data processing circuit is not able to respond to the required diagnostic operation by returning a diagnostic bus transaction error signal. Such an error signal can then be interpreted by the diagnostic transaction request master as indicating that the data processing circuit concerned is not able to perform the requested diagnostic operation. In this way, race conditions can be avoided and diagnostic transaction bus bandwidth is not wasted upon power status queries.

Whilst it will be appreciated that the different states which render the data processing circuit either able or not able to perform the requested diagnostic operations could take a variety of different forms, a common situation in which this behavior arises is one in which the states correspond to an operational state and a low-power state (e.g. a powered-down state, a sleep mode state etc).

In the context of a system in which the data processing circuit may be powered-down, the present technique preferably leaves the diagnostic interface circuit remaining powered such that this can respond to some requests (e.g. requests for data processing circuit identification) as well as generating the appropriate bus transaction error signals to signal that the associated data processing circuit is powered-down.

Whilst the present technique could be used within a system including a single data processing circuit with an associated diagnostic interface, the technique is particularly well suited to systems including a plurality of data processing circuits each with an associated diagnostic interface circuit and connected via a diagnostic transaction bus because the present technique scales well to such multi-unit systems.

In preferred embodiments of the invention, the diagnostic interface circuit is operable to continue to return a diagnostic bus transaction error signal even after the associated data processing circuit has returned to its operational state and until the generation of that error signal is explicitly cleared. Thus, power down events which have occurred whilst no diagnostic transaction requests were being made can be identified at a later time since they can have altered the configuration of the system from that assumed by the diagnostic mechanisms.

The change of state may be noted either when moving from the operational condition to the non-operation condition or from the non-operational condition back to the operational condition. Such a transition is advantageously recorded within a sticky-bit (the bit remains set even when the condition being indicated has been removed).

Whilst the present technique could be used within a system comprising discrete components it is particularly well suited for use on system-on-chip integrated circuit designs since these often show complex power on, power off behavior.

Viewed from another aspect the present invention provides a method of processing data, said method comprising the steps of:

performing data processing with a data processing circuit;

performing diagnostic operations upon said data processing circuit with a diagnostic interface circuit coupled to said data processing circuit, said data processing circuit being switchable between a first state in which said diagnostic interface circuit cannot perform at least some diagnostic operations upon said data processing circuit and a second state in which said diagnostic interface circuit can perform said at least some diagnostic operations upon said data processing circuit; and issuing diagnostic transaction requests to said diagnostic interface circuit with a diagnostic transaction request master circuit coupled via a diagnostic transaction bus to said diagnostic interface circuit; wherein in response to a diagnostic transaction request received whilst said data processing circuit is in said first state, returning a diagnostic bus transaction error signal.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
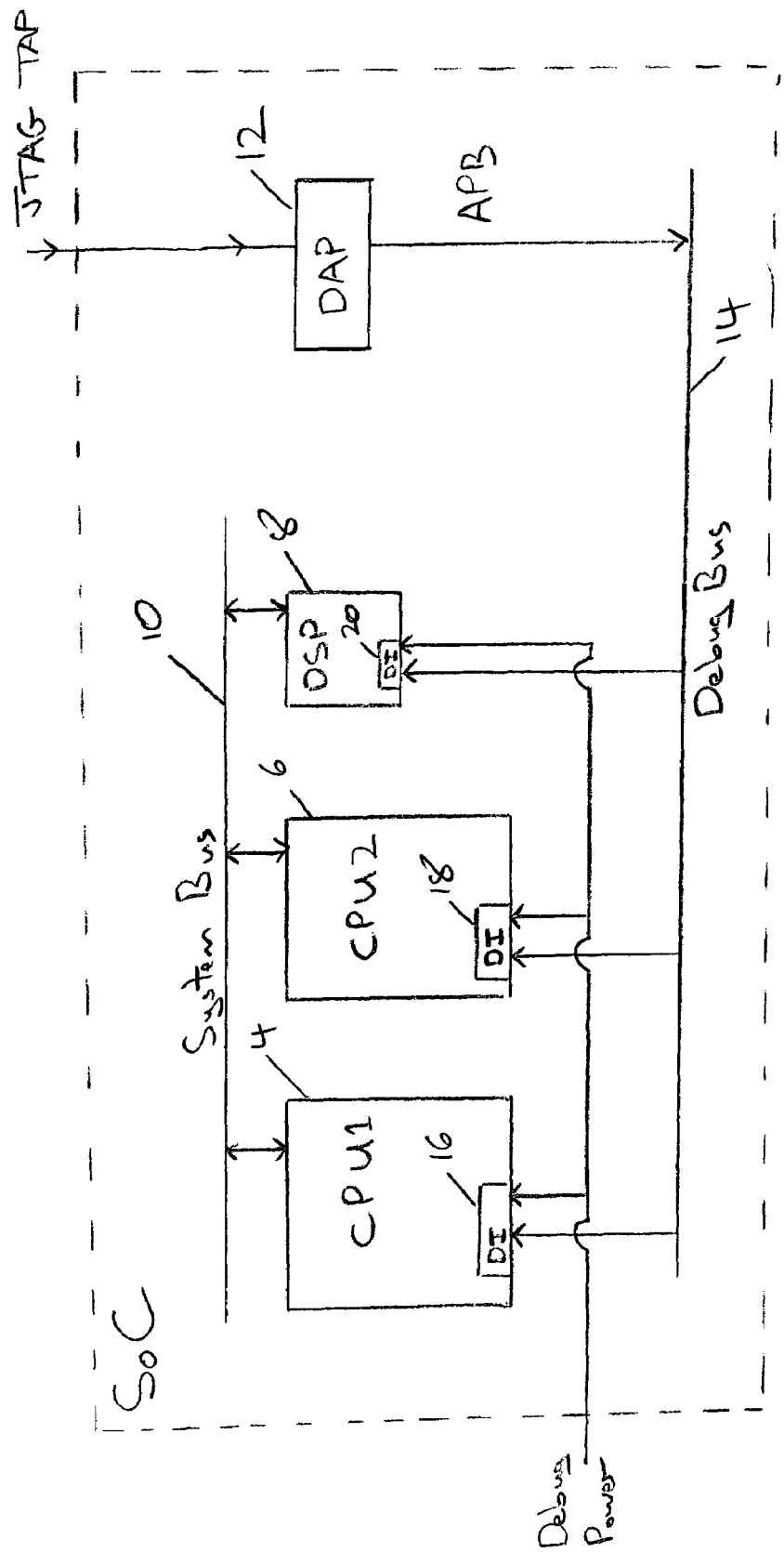
FIG. 1 schematically illustrates a system-on-chip integrated circuit including a plurality of data processing circuits and a diagnostic mechanism.

FIG. 1 illustrates an integrated circuit 2 comprising a system-on-chip design including a first CPU 4, a second CPU 6 and a DSP circuit 8. In their normal operational the first CPU 4, the second CPU 6 and the DSP circuit 8 communicate via an operational system bus 10 using known techniques. The operational behavior of the integrated circuit 2 can take a variety of different forms and be supported by many additional circuit elements (not illustrated herein for the sake of clarity) as will be familiar to those in this technical field.

A diagnostic mechanism is provided on the integrated circuit 2 to allow an external diagnostic system (such as an appropriately programmed general purpose computer) to instruct diagnostic operations to be performed upon respective data processing circuits 4, 6, 8 within the integrated circuit 2. This diagnostic mechanism can include a serial JTAG test access port for providing serial data access to a data access port 12 which converts the serial JTAG requests into parallel bus transactions using an APB (AMBA Peripheral Bus) bus as a diagnostic transaction bus 14. Each of the data processing circuits 4, 6, 8 includes a respective diagnostic interface circuit 16, 18, 20 which receives the diagnostic transaction requests from the diagnostic transaction bus 14 and returns an appropriate response having performed the requested diagnostic operation. Some of the diagnostic operations may be performed within the diagnostic interface circuits 16, 18, 20 themselves (such as returning a data processing circuit ID), whereas others may require action to be performed within the associated data processing circuit 4, 6, 8, such as the setting of a breakpoint register or a watchpoint register within the power domain of the data processing circuit 4, 6, 8.

The diagnostic interface circuits 16, 18, 20 are provided with their own diagnostic power supply which is maintained even when the associated data processing circuit 4, 6, 8 enters a low power or power down mode such that the diagnostic interface circuit 16, 18, 20 can respond to diagnostic transaction requests internal to itself or return diagnostic bus transaction errors in the case of diagnostic transaction requests which are not able to be performed due to the current state of the associated data processing circuit 4, 6, 8.

Figure 2:
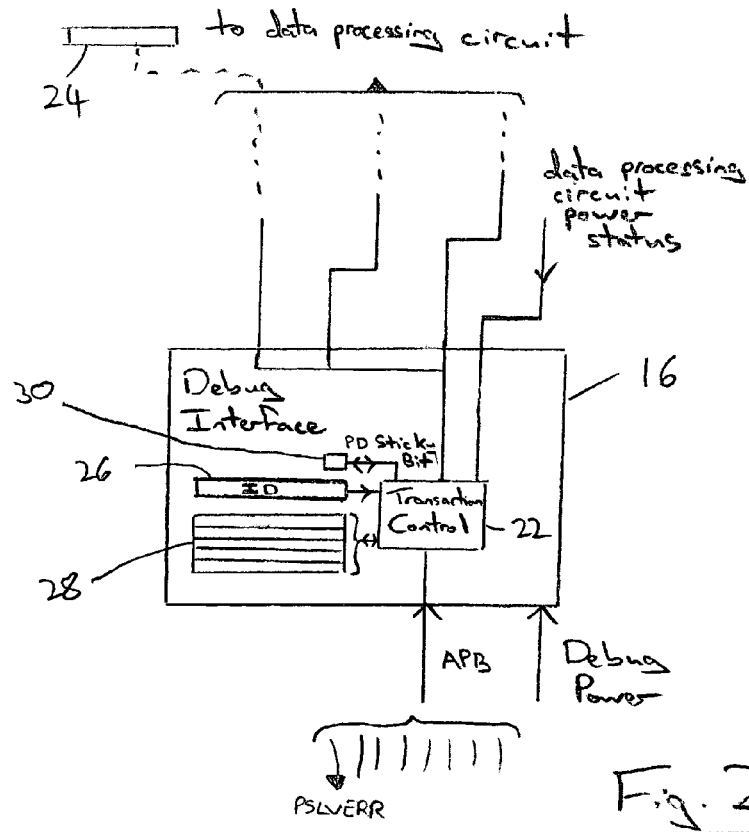
FIG. 2 schematically illustrates in more detail a diagnostic interface circuit used to couple a data processing circuit of FIG. 1 to a diagnostic bus.

FIG. 2 illustrates the diagnostic interface circuit 16 in more detail. Within the diagnostic interface circuit 16 a transaction controller 22 is coupled to the diagnostic transaction bus 14 via an APB bus modified to include a diagnostic bus transaction error signal PSLVERR which signals back to the diagnostic access port 12 (the diagnostic transaction request master circuit), that the associated data processing circuit 4 is not able to respond to the requested diagnostic operation. As an example, a diagnostic register 24 located within the data processing circuit 4 may be powered-down or otherwise non-responsive due to the particular state of the data processing circuit 4 and accordingly a request to either read or write that register 24 may not be possible and a diagnostic bus transaction error returned so as to indicate this to the diagnostic access port 12 which is serving as the diagnostic transaction request master. Also illustrated within the diagnostic interface circuit 16 are an ID register 26 which is programmed to hold an ID value identifying the data processing circuit to the diagnostic system. Diagnostic controlling registers 28 also serve to store various parameters associated with the diagnostic operation, such as status and control information. The registers 26, 28 within the diagnostic interface circuit 16 are powered by the diagnostic power domain and so remain operational even when the associated data processing circuit 4 is powered-down and thus diagnostic transaction requests made to these registers may be serviced even though the data processing circuit 4 is non-operational.

Also illustrated within the diagnostic interface circuit 16 is a sticky bit latch 30 (this latch may be embodied in a variety of different forms and the term latch should be considered to include flip-flops, registers and the like). The sticky bit latch 30 is set when the data processing circuit 4 transitions between its different power states. This setting of the sticky bit may occur upon a transition from power-up to power-down or alternatively on a transition from power-down to power-up. The purpose of the sticky bit latch 30 is to force the transaction control circuit 22 to return a diagnostic bus transaction error signal when such a power-down event has occurred even though the data processing circuit may now be powered up again and so responsive to the diagnostic transaction requests. In this way, configuration which may have been lost, but which is assumed to be present by the diagnostic mechanisms within the data processing circuit 4, can be reprogrammed as appropriate before diagnostic operations proceed further.

Figure 3:
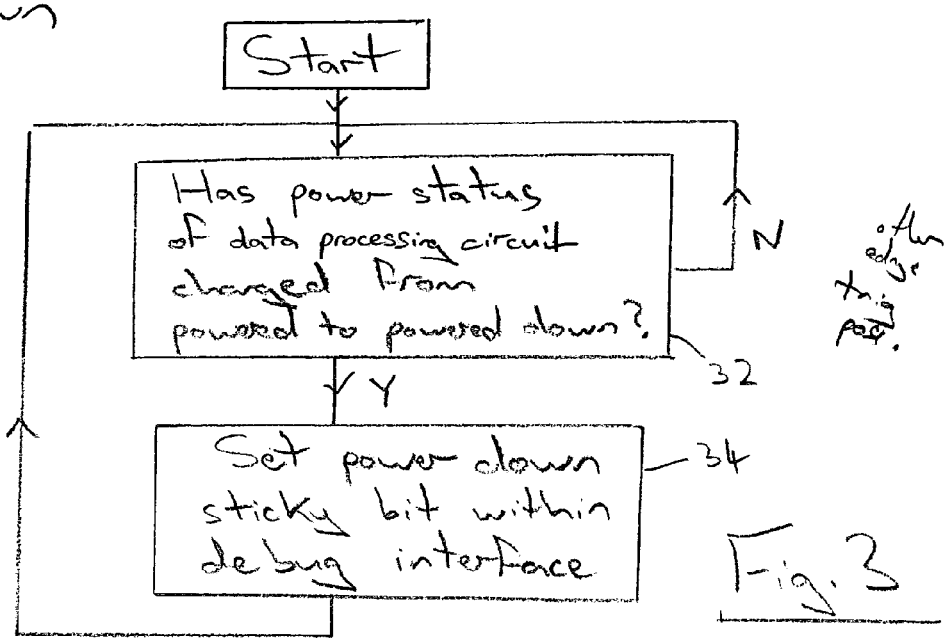
FIG. 3 is a flow diagram schematically illustrating the operation of the diagnostic interface circuit in setting a sticky bit to record a power-down event.

FIG. 3 schematically illustrates control of the setting of the sticky bit latch 30. At step 32 hardware circuit elements within the diagnostic interface 16 continuously monitor to identify a transition of the data processing circuit 4 from a power-up status to a power-down status. When such a transition occurs, the processing proceeds to step 34 at which the sticky bit within the diagnostic interface circuit 16 is set. This sticky bit can later be read to clear the power-down event indication by a diagnostic bus transaction read request to that sticky bit latch 30. (An arrangement whereby the sticky bit is cleared upon read is preferred since it avoids the potential for a race condition when reading and later writing this bit when a further intervening power down event occurs.) It will be appreciated that the process illustrated in FIG. 3 sets the sticky bit upon power-down whereas alternative embodiments may set their sticky bit upon power-up.

Figure 4:
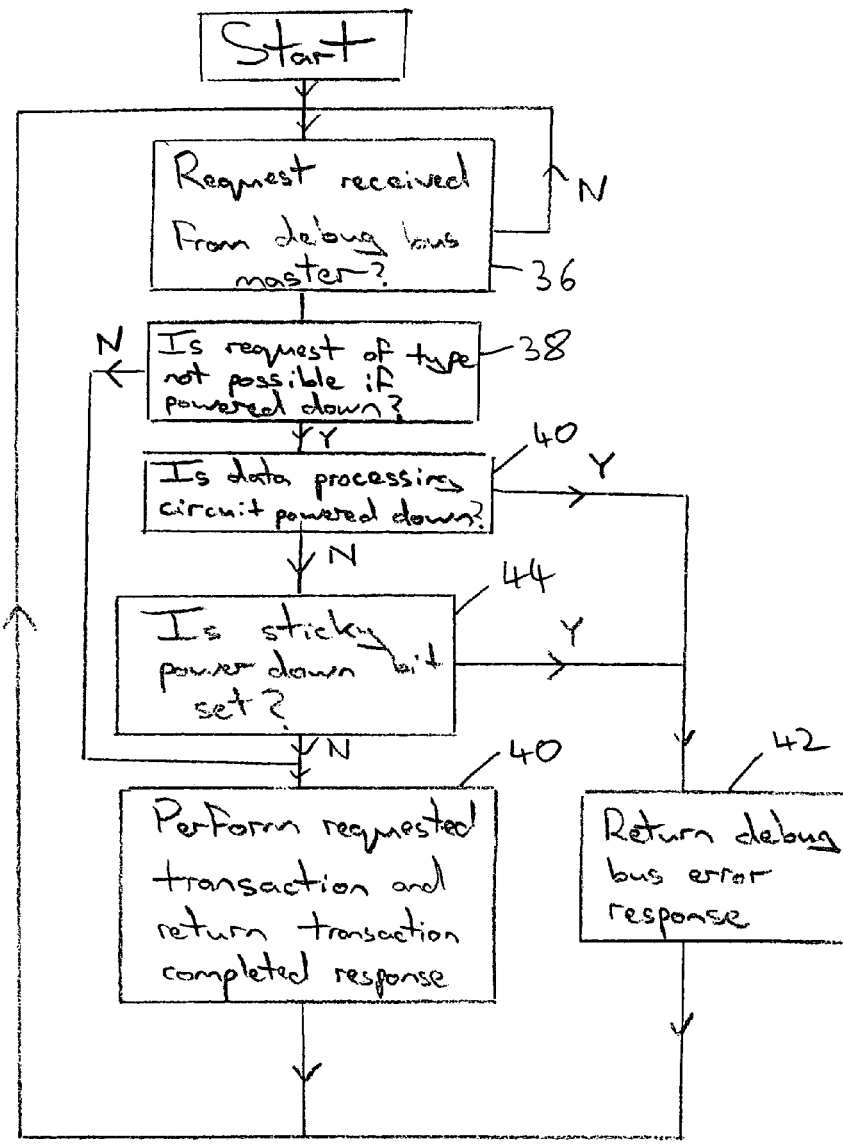
FIG. 4 is a flow diagram schematically illustrating the diagnostic interface circuit responding to a diagnostic transaction request received from a diagnostic master circuit.

FIG. 4 is a flow diagram schematically illustrating the action of the transaction control circuit 22 in response to received diagnostic transaction requests. At step 36 the transaction control circuit 22 waits until a diagnostic transaction request is received via the diagnostic transaction bus 14 from the diagnostic transaction master 12. When such a request is received, processing proceeds to step 38 at which an evaluation is made as to whether that transaction request is of a type which may be serviced by the diagnostic interface 16 itself irrespective of the power status of the associated data processing circuit 4. If the transaction request is of such a type, then processing proceeds directly to step 40 at which the requested diagnostic transaction is performed and the appropriate response returned via the diagnostic transaction bus 14 to the diagnostic transaction master circuit 12.

If the determination at step 38 was that the transaction is one of a type which would not be possible if the data processing circuit 4 is powered-down, then processing proceeds to step 40 at which a determination is made as to whether the data processing circuit 4 is currently powered-down. If the data processing circuit 4 is currently powered-down, then processing proceeds to step 42 at which a diagnostic bus transaction error signal is returned via the diagnostic transaction bus 14 to the diagnostic transaction master circuit 12. If the determination at step 40 is that the data processing circuit 4 is currently powered up, then processing proceeds to step 44 at which a determination is made as to whether or not the sticky bit is set indicating that a power-down event has occurred and has not yet been cleared by the diagnostic mechanisms. If the sticky bit is detected as being set at step 44, then processing proceeds to step 42 and the diagnostic bus transaction error signal is returned. If the sticky bit is not detected as set at step 44, then processing proceeds to step 40 and the desired transaction is performed and the appropriate result returned. After both steps 40 and 42, processing is returned back to step 36 to await the next diagnostic bus transaction request.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:
    an data processing circuit operable to perform data processing;
    a diagnostic interface circuit coupled to said data processing circuit and operable to perform diagnostic operations upon said data processing circuit, said data processing circuit being switchable between a first state in which said diagnostic interface circuit cannot perform at least some diagnostic operations upon said data processing circuit and a second state in which said diagnostic interface circuit can perform said at least some diagnostic operations upon said data processing circuit; and
    a diagnostic transaction request master circuit coupled via a diagnostic transaction bus to said diagnostic interface circuit and operable to issue diagnostic transaction requests to said diagnostic interface circuit; wherein
    said diagnostic interface circuit is responsive to a diagnostic transaction request received from said diagnostic transaction request master whilst said data processing circuit is in said first state to return a diagnostic bus transaction error signal to said diagnostic transaction request master.

2. Apparatus as claimed in claim 1, wherein said data processing circuit is in a low power consumption state whilst in said first state and said data processing circuit is in an operational state whilst in said second state.

3. Apparatus as claimed in claim 2, wherein said diagnostic interface circuit remained powered whilst said data processing circuit is in said first state.

4. Apparatus as claimed in claim 1, comprising a plurality of data processing circuits having respective diagnostic interface circuits and coupled to said diagnostic transaction request master via said diagnostic transaction bus.

5. Apparatus as claimed in claim 1, wherein said diagnostic interface circuit is operable to continue to return a diagnostic bus transaction error signal to said diagnostic transaction request master following said data processing circuit switching between said second state and said first state until a request is made to clear generation of said diagnostic bus transaction error signal.

6. Apparatus as claimed in claim 5, wherein said diagnostic interface circuit includes a state change detecting circuit operable to set a state change indicating latch within said diagnostic interface upon detection of said data processing circuit changing between said second state and said first state, said state change indicating latch being reset when said diagnostic transaction request master requests clearing of diagnostic bus transaction signal generation, and said bus interface circuit being operable to generate a diagnostic bus transaction error signal in response to a diagnostic transaction request when said state change indicating latch is set.

7. Apparatus as claimed in claim 1, comprising a system-on-chip integrated circuit.

8. A method of processing data, said method comprising the steps of:
performing data processing with a data processing circuit;
performing diagnostic operations upon said data processing circuit with a diagnostic interface circuit coupled to said data processing circuit, said data processing circuit being switchable between a first state in which said diagnostic interface circuit cannot perform at least some diagnostic operations upon said data processing circuit and a second state in which said diagnostic interface circuit can perform said at least some diagnostic operations upon said data processing circuit; and
issuing diagnostic transaction requests to said diagnostic interface circuit with a diagnostic transaction request master circuit coupled via a diagnostic transaction bus to said diagnostic interface circuit; wherein
in response to a diagnostic transaction request received whilst said data processing circuit is in said first state, returning a diagnostic bus transaction error signal.

9. A method as claimed in claim 8, wherein said data processing circuit is in a low power consumption state whilst in said first state and said data processing circuit is in an operational state whilst in said second state.

10. A method as claimed in claim 9, wherein said diagnostic interface circuit remained powered whilst said data processing circuit is in said first state.

11. A method as claimed in claim 8, comprising a plurality of data processing circuits having respective diagnostic interface circuits and coupled to said diagnostic transaction request master via said diagnostic transaction bus.

12. A method as claimed in claim 8, wherein said diagnostic interface circuit is operable to continue to return a diagnostic bus transaction error signal to said diagnostic transaction request master following said data processing circuit switching between said second state and said first state until a request is made to clear generation of said diagnostic bus transaction error signal.

13. A method as claimed in claim 12, wherein said diagnostic interface circuit includes a state change detecting circuit operable to set a state change indicating latch within said diagnostic interface upon detection of said data processing circuit changing between said second state and said first state, said state change indicating latch being reset when said diagnostic transaction request master requests clearing of diagnostic bus transaction signal generation, and said bus interface circuit being operable to generate a diagnostic bus transaction error signal in response to a diagnostic transaction request when said state change indicating latch is set.

14. A method as claimed in claim 8, comprising a system-on-chip integrated circuit.

* * * * *